United States Patent
Kogiso

(10) Patent No.: US 12,361,232 B2
(45) Date of Patent: Jul. 15, 2025

(54) IMAGE FORMING APPARATUS, SYSTEM, AND METHOD THAT CHANGES OUTPUT INTENSITY OR RECEIVED THRESHOLD BASED ON AN IMAGE FORMING OPERATION

(71) Applicant: TOSHIBA TEC KABUSHIKI KAISHA, Tokyo (JP)

(72) Inventor: Yoshiki Kogiso, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 233 days.

(21) Appl. No.: 18/098,142

(22) Filed: Jan. 18, 2023

(65) Prior Publication Data
US 2023/0401394 A1   Dec. 14, 2023

(30) Foreign Application Priority Data
Jun. 10, 2022   (JP) ................. 2022-094521

(51) Int. Cl.
*G06K 7/10* (2006.01)
*G06F 3/12* (2006.01)
*G06K 7/00* (2006.01)

(52) U.S. Cl.
CPC ....... *G06K 7/10099* (2013.01); *G06F 3/1222* (2013.01); *G06F 3/1238* (2013.01); *G06F 3/1285* (2013.01); *G06K 7/0004* (2013.01)

(58) Field of Classification Search
CPC . G06K 7/10099; G06F 3/1222; G06F 3/1238; G06F 3/1285
See application file for complete search history.

(56) References Cited

U.S. PATENT DOCUMENTS 10,228,646 B1    3/2019   Kenmotsu
10,866,774 B1 *  12/2020  Ormond ............... G06F 3/1263
(Continued)

FOREIGN PATENT DOCUMENTS

JP   2001-160117   6/2001
JP   2009-234106   10/2009
(Continued)

*Primary Examiner* — Nicholas Pachol
(74) *Attorney, Agent, or Firm* — Amin, Turocy & Watson, LLP

(57) ABSTRACT

According to one embodiment, an image forming apparatus includes a forming unit, a communication unit, a reader/writer unit, a reader unit, and a determination unit. If the forming unit executes the image formation on the print medium, the reader/writer unit is configured to execute, using the communication unit, an operation of writing data into a wireless tag attached to the print medium on which the image formation is to be executed or an operation of reading data from the wireless tag. If the image formation that is accompanied by the operation of writing data or the operation of reading data by the reader/writer unit is not executed, the reader unit is configured to read an identifier of a user from a wireless tag that stores the identifier using the communication unit if communication between the wireless tag and the communication unit is enabled. The determination unit is configured to determine that the user approaches the image forming apparatus if the identifier read by the reader unit satisfies a predetermined condition.

20 Claims, 8 Drawing Sheets

(56) References Cited

U.S. PATENT DOCUMENTS

| | | |
|---|---|---|
| 2005/0190707 A1 | 9/2005 | Nishizawa et al. |
| 2009/0284790 A1* | 11/2009 | Ohashi ............... H04N 1/00204 |
| | | 358/1.15 |
| 2010/0188696 A1* | 7/2010 | Ohmiya ................ G06F 3/1222 |
| | | 358/1.15 |
| 2017/0155793 A1* | 6/2017 | Masumoto ............ G06F 3/1288 |
| 2020/0007540 A1* | 1/2020 | Kawaguchi ........... H04L 9/0861 |
| 2021/0216259 A1* | 7/2021 | Ullmann ............... G06F 3/1238 |
| 2021/0306473 A1* | 9/2021 | Inouye ............... H04N 1/00307 |
| 2022/0019751 A1* | 1/2022 | Tomiyama ......... G06K 7/10445 |

FOREIGN PATENT DOCUMENTS

| | | |
|---|---|---|
| JP | 2015-066780 | 4/2015 |
| WO | 2008/117565 | 10/2008 |

* cited by examiner

… (1)

IMAGE FORMING APPARATUS, SYSTEM, AND METHOD THAT CHANGES OUTPUT INTENSITY OR RECEIVED THRESHOLD BASED ON AN IMAGE FORMING OPERATION

CROSS-REFERENCE TO RELATED APPLICATION

This application is based upon and claims the benefit of priority from Japanese Patent Application No. 2022-094521, filed on Jun. 10, 2022, the entire contents of which are incorporated herein by reference.

FIELD

Embodiments described herein relate generally to an image forming apparatus, an image forming process system, and an information processing method.

BACKGROUND

In many image forming apparatuses, a power saving operation of reducing power consumption during stand-by is executed. However, there may be a case where an image forming operation cannot be executed for a while after canceling the power saving operation. Accordingly, an image forming apparatus that cancels the power saving operation and executes preparation for the image forming operation if a person approaches the image forming apparatus is known.

However, a human detection sensor or the like for detecting the approach of the person needs to be provided. In addition, even if a person who does not use the image forming apparatus passes through a detection range, an infrared sensor or the like that is generally used as the human detection sensor determines that the person approaches the image forming apparatus.

Under these circumstances, it is desired that a dedicated device for detecting the approach of a user does not need to be provided while providing a function for the detection and the possibility of erroneous detection of the approach of a person who is not the user to be detected as the approach of the user can be reduced.

DETAILED DESCRIPTION

Embodiments provide an image forming apparatus that does not need a dedicated device for detecting the approach of a user while providing a detection function for the detection and can reduce the possibility of erroneous detection of the approach of a person who is not the user to be detected as the approach of the user, an image forming process system, and an information processing method.

In general, according to one embodiment, an image forming apparatus includes a forming unit, a communication unit, a reader/writer unit, a reader unit, and a determination unit. The forming unit is configured to form an image on a print medium. The communication unit is configured to wirelessly communicate with a wireless tag. If the forming unit executes the image formation on the print medium, the reader/writer unit is configured to execute using the communication unit, one of at least an operation of writing data into a wireless tag attached to the print medium on which the image is to be formed or an operation of reading data from a wireless tag attached to the print medium on which the image is to be formed. If the image formation that is accompanied by one of at least the operation of writing data or the operation of reading data by the reader/writer unit is not executed, the reader unit is configured to read an identifier of a user from a wireless tag that stores the identifier using the communication unit if communication between the wireless tag and the communication unit is enabled. The determination unit is configured to determine that the user approaches the image forming apparatus if the identifier read by the reader unit satisfies a predetermined condition.

Hereinafter, an example of an embodiment will be described using the drawings. In the embodiment, an image forming process system configured to include a multi-function peripheral having a function as an image forming apparatus will be described as an example.

Figure 1:
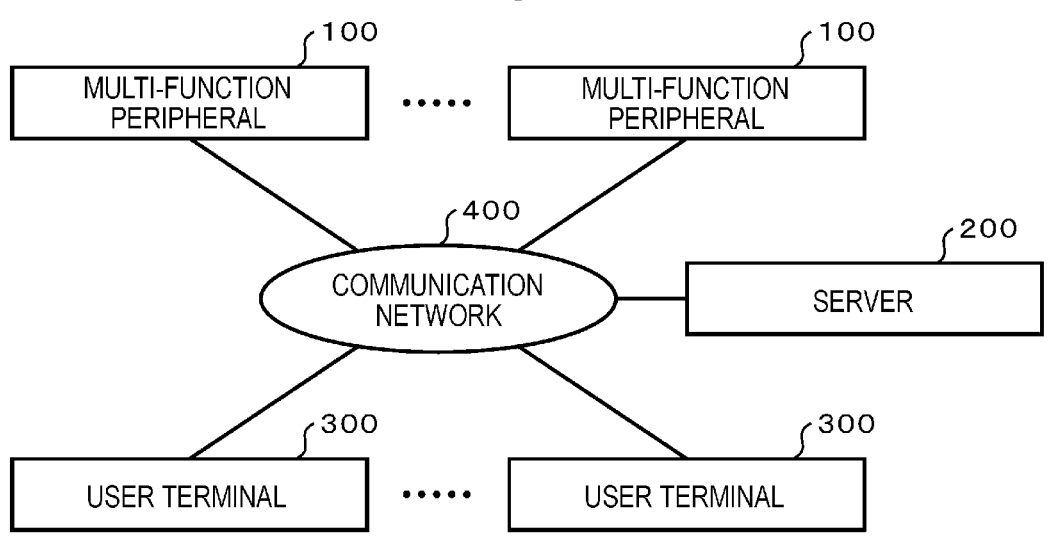
FIG. 1 is a block diagram illustrating a configuration example of an image forming process system according to one embodiment.

FIG. 1 is a block diagram illustrating a configuration example of the image forming process system according to the embodiment.

The image forming process system illustrated in FIG. 1 is an example configured to include a plurality of multi-function peripherals 100 provided in a workplace such as an office. The image forming process system is configured such that the plurality of multi-function peripherals 100, a server 200, and a plurality of user terminals 300 can communicate with each other through a communication network 400.

The multi-function peripheral 100 is an apparatus that implements a plurality of functions such as a print function, a copying function, or a facsimile function that is accompanied by an image forming operation. The multi-function peripheral 100 may implement a function such as a scanning function or a data file management function that is not accompanied by the image forming operation. The multi-function peripheral 100 includes at least a function (hereinafter, referred to as "network print function") of executing printing in response to a print request from the user terminal 300 and a function (hereinafter, referred to as "RFID print function") of communicating with a radio frequency identification (RFID) tag attached to print paper while executing image formation on the print paper, and may further include other functions. The multi-function peripheral 100 will also be referred to as "MFP".

The server 200 manages the print request from the user terminal 300 to the multi-function peripheral 100 and has a function as a print server that mediates therebetween. The server 200 is a local server in the embodiment. However, the server 200 may be a web server or a cloud server.

The user terminal 300 manages various data and requests the multi-function peripheral 100 to execute printing based on the data via the communication network 400. The user terminal 300 is an information processing apparatus that is used in a workplace by a user of the multi-function peripheral 100. As the user terminal 300, any of various types of information processing apparatuses such as a desktop computer, a tablet computer, or a smartphone may be used.

As the communication network 400, the Internet, a virtual private network (VPN), a local area network (LAN), a public communication network, a mobile communication network, and the like can be used by itself or can be used appropriately in combination. As the communication network 400, for example, a LAN is used.

Figure 2:
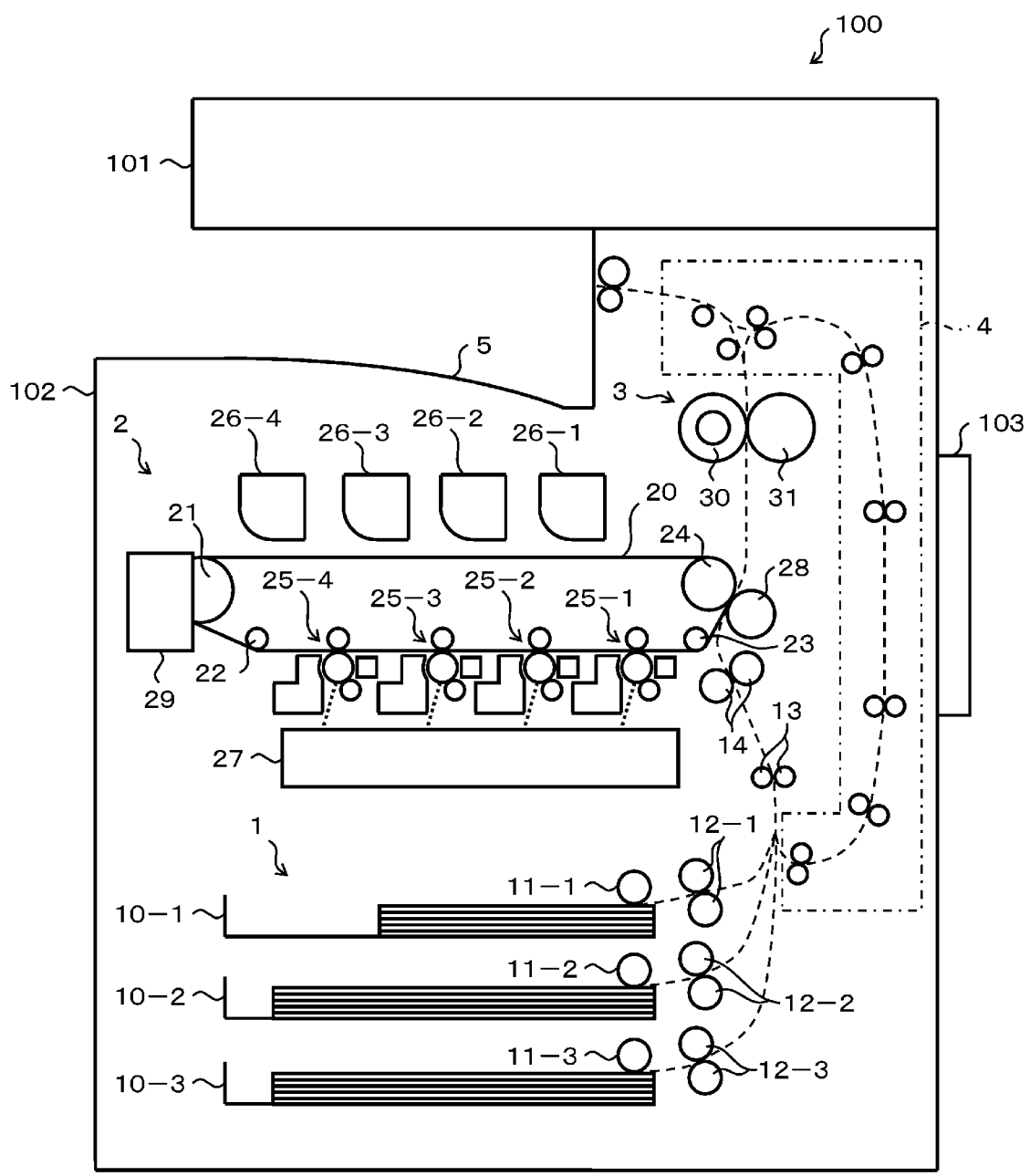
FIG. 2 is a diagram illustrating a mechanical configuration of a multi-function peripheral illustrated in FIG. 1.

FIG. 2 is a diagram illustrating a mechanical configuration of the multi-function peripheral 100. FIG. 2 does not exactly illustrate the mechanical configuration of the multi-function peripheral 100, in which shapes and position relationships of some elements may also be different.

As illustrated in FIG. 2, the multi-function peripheral 100 includes a scanner 101, a printer 102, and a tag reader/writer 103.

The scanner 101 reads an image of a document and generates image data corresponding to the image. For example, the scanner 101 generates image data corresponding to a reflected light image from a surface of a document to be read using an image sensor such as a charge-coupled device (CCD) line sensor. The scanner 101 scans a document placed on a document tray using the image sensor that moves along the document. Alternatively, the scanner 101 scans a document that is conveyed by an auto document feeder (ADF) using a fixed image sensor.

The printer 102 forms an image using an electrophotographic method on a print medium on which image formation is to be executed. Typically, the print medium is print paper such as cut paper. Therefore, in the following description, print paper is used as the print medium. As the print medium, a sheet of another paper different from cut paper may be used, or a sheet of a material such as a resin other than paper may be used. The printer 102 has a color printing function of printing a color image on print paper and a monochrome printing function of printing a monochrome image on print paper. The printer 102 forms a color image by forming element images to overlap each other with, for example, toners of three colors including yellow, magenta, and cyan, or four colors including black in addition to the three colors. In addition, the printer 102 forms a monochrome image, for example, with a black toner. The printer 102 may include only either one of the color printing function or the monochrome printing function.

The tag reader/writer 103 is provided as an optional unit separated from a main body of the multi-function peripheral 100, and is attached to a side surface of the main body of the multi-function peripheral 100 as illustrated in FIG. 2. The tag reader/writer 103 may be attached to another position such as a front surface of the main body of the multi-function peripheral 100. In addition, the tag reader/writer 103 may be built in the main body of the multi-function peripheral 100. The tag reader/writer 103 is a communication unit that wirelessly communicates with the RFID tag as an example of the wireless tag. The tag reader/writer 103 reads data stored in the RFID tag. The tag reader/writer 103 writes any data into the RFID tag. The RFID tag is attached to print paper that is conveyed for the image formation in the printer 102. Alternatively, the RFID tag is built in, for example, an identification (ID) card that is held by the user.

In the configuration example illustrated in FIG. 2, the printer 102 includes a paper feed unit 1, a print engine 2, a fixing unit 3, an automatic duplexing unit (ADU) 4, and a paper discharge tray 5.

The paper feed unit 1 includes paper feed cassettes 10-2, and 10-3, pickup rollers 11-1, 11-2, and 11-3, conveying rollers 12-1, 12-2, and 12-3, a conveying roller 13, and a registration roller 14.

The paper feed cassettes 10-1 to 10-3 accommodate sheets of print paper in a state where the sheets are stacked. The sheets of print paper accommodated in the paper feed cassettes 10-1 to 10-3 may be different types of print paper having different sizes and materials or may be the same type of print paper. In addition, the paper feed unit 1 may include a manual feed tray.

The pickup rollers 11-1 to 11-3 pick up the print paper from each of the paper feed cassettes 10-1 to 10-3 one by one. The pickup rollers 11-1 to 11-3 supply the picked print paper to the conveying rollers 12-1 to 12-3.

The conveying rollers 12-1 to 12-3 supply the print paper supplied from the pickup rollers 11-1 to 11-3 to the conveying roller 13 through a conveyance path formed by a guide member (not illustrated) or the like.

The conveying roller 13 further conveys and supplies the print paper supplied from any one of the conveying rollers 12-1 to 12-3 to the registration roller 14.

The registration roller 14 corrects a tilt of the print paper. The registration roller 14 adjusts a timing at which the print paper is supplied to the print engine 2.

The paper feed cassettes, the pickup rollers, and the conveying rollers are not limited to three sets, and the number of sets may be freely set. In addition, if the manual feed tray is provided, it is not necessary to provide even one set including the paper feed cassette, the pickup roller, and the conveying roller, the paper feed cassette being paired with the pickup roller and the conveying roller.

The print engine 2 includes a belt 20, support rollers 21, 22, 23, and 24, image forming units 25-1, 25-2, 25-3, and 25-4, supply units 26-1, 26-2, 26-3, and 26-4, an exposure unit 27, a transfer roller 28, and a belt cleaner 29.

The belt 20 has an endless shape and is supported by the support rollers 21, 22, 23, and 24 to maintain the state illustrated in FIG. 2. The belt 20 rotates counterclockwise in FIG. 2 along with the rotation of the support roller 21. The belt 20 temporarily carries a toner image on a surface positioned on the outside (hereinafter, referred to as "image carrying surface"), the toner image being an image to be formed on the print paper. That is, the belt 20 is an example of the image carrier. From the viewpoints of heat resistance and wear resistance, for example, a semi-conductive polyimide is used as the belt 20. The image carrying surface moves along with the rotation of the belt 20 such that so-called sub-scanning is implemented, and a moving direction of the image carrying surface will also be referred to as "sub-scanning direction".

Each of the image forming units 25-1 to 25-4 includes a photoconductor, a charging unit, a developing unit, a transfer unit, and a cleaner. Each of the image forming units 25-1 to 25-4 forms an image using an electrophotographic method in cooperation with the exposure unit 27. The transfer unit may be provided in another unit such as a unit including the belt 20 instead of being provided in the image forming units 25-1 to 25-4, or may be present in a state where it does not belong to any of the units. The image forming units 25-1 to 25-4 are arranged along the belt 20 in a state where axis directions of the photoconductors thereof are parallel to each other. The image forming units 25-1 to 25-4 have the same structure and operation except that only the colors of the toners to be used are different from each other. The image forming unit 25-1 forms, for example, an element image of black. The image forming unit 25-2 forms, for example, an element image of cyan. The image forming unit 25-3 forms, for example, an element image of magenta. The image forming unit 25-4 forms, for example, an element image of yellow. The image forming units 25-1 to 25-4 form the respective color element images to overlap each other on the image carrying surface of the belt 20. As a result, the image forming units 25-1 to 25-4 form a color image in which the respective element images overlap each other on the image carrying surface of the belt 20 if the image carrying surface passes through the image forming unit 25-1.

The supply units 26-1, 26-2, 26-3, and 26-4 can mount toner bottles containing toners and can supply the toners in the toner bottles mounted to the image forming units 25-1 to 25-4, respectively. The toner bottle may contain the toner alone, that is may contain the toner as a so-called one-component developer, or may contain the toner as a so-called multi-component developer where the toner and another material such as a carrier are mixed. If the toner bottles contain the multi-component developers, the supply units 26-1, 26-2, 26-3, and 26-4 supply the toner together with the material such as a carrier. FIG. 2 does not illustrate paths through which the toner is supplied from the supply units 26-1 to 26-4 to the image forming units 25-1 to 25-4.

The exposure unit 27 exposes the photoconductor of each of the image forming units 25-1 to 25-4 in accordance with image data representing the respective color element images. As the exposure unit 27, for example, a laser scanner or a light emitting diode (LED) head is used. If the laser scanner is used, for example, the exposure unit 27 includes a semiconductor laser element, a polygon mirror, an imaging lens system, and a mirror. In this case, the exposure unit 27 selectively enters, for example, a laser beam emitted from the semiconductor laser element in accordance with image data to the respective photoconductors of the image forming units 25-1 to 25-4 by changing an emission direction from the mirror. In addition, the exposure unit 27 scans the laser beam in the axis direction of the photoreceptor (a depth direction in FIG. 2) with the polygon mirror for scanning the photoconductor. This scanning with the laser beam is a so-called main scanning, and the direction thereof will be referred to as "main scanning direction".

The transfer roller 28 is arranged parallel to the support roller 24, and the belt 20 is interposed between the transfer roller 28 and the support roller 24. The print paper supplied from the registration roller 14 is interposed between the transfer roller 28 and the image carrying surface of the belt 20. The transfer roller 28 transfers the toner image formed on the image carrying surface of the belt 20 to the print paper using an electrostatic force.

The belt cleaner 29 removes toner remaining on the image carrying surface of the belt 20 without being completely transferred to the print paper.

Thus, the print engine 2 forms the image using an electrophotographic method on the print paper supplied by the registration roller 14. That is, the print engine 2 is an example of the forming unit.

The fixing unit 3 includes a fixing roller 30 and a pressurization roller 31.

In the fixing roller 30, a heater is accommodated in, for example, a heat-resistant metal roller. The heater is, for example, an induction heater (IH), and any other type of heater can be appropriately used. The fixing roller 30 melts the toner that is attached to the print paper supplied from the print engine 2 such that the toner is fixed to the print paper.

The pressurization roller 31 is provided in a state where it is parallel to the fixing roller 30 and pressed against the fixing roller 30. The print paper supplied from the print engine 2 is interposed between the pressurization roller 31 and the fixing roller 30 and is pressed against the fixing roller.

The ADU 4 includes a plurality of rollers and selectively executes the following two operations. In the first operation, the print paper that passes the fixing unit 3 is supplied to the paper discharge tray 5 as it is. The first operation is executed after completion of one-sided printing or double-side printing. In the second operation, the print paper that passes the fixing unit 3 is temporarily conveyed to the paper discharge tray 5 side, is switched back, and is supplied to the print engine 2. The second operation is executed after completion of image formation on only one side during double-sided printing.

The paper discharge tray 5 receives the discharged print paper on which the image is formed.

Figure 3:
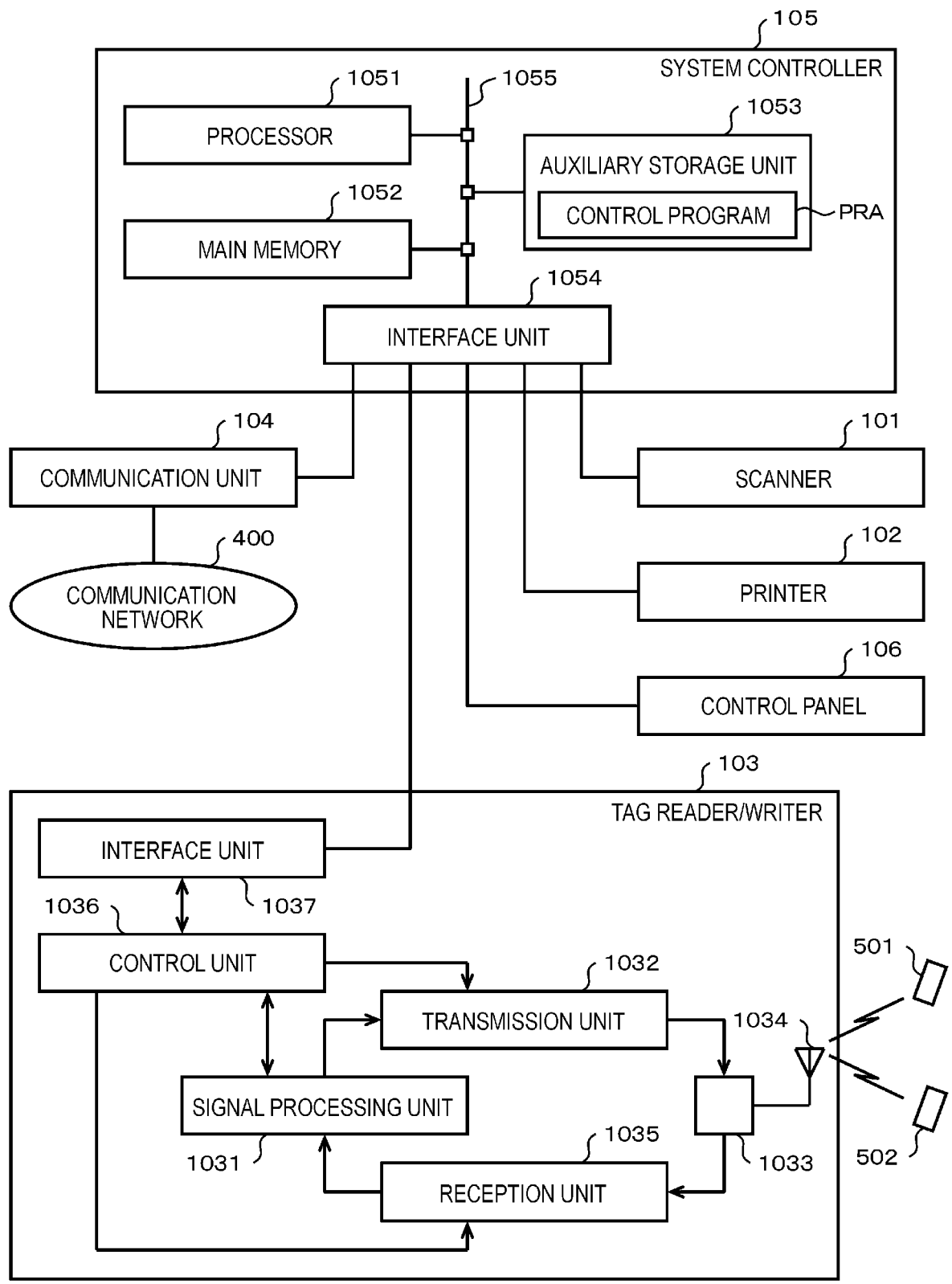
FIG. 3 is a block diagram schematically illustrating a configuration relating to a control of the multi-function peripheral illustrated in FIG. 1.

FIG. 3 is a block diagram schematically illustrating a main circuit configuration relating to a control of the multi-function peripheral 100. In FIG. 3, the same components as those of FIGS. 1 and 2 are represented by the same reference numerals, and the detailed description thereof will not be repeated.

In addition to the scanner 101, the printer 102, and the tag reader/writer 103, the multi-function peripheral 100 includes a communication unit 104, a system controller 105, and a control panel 106.

The communication unit 104 executes a process for communication with the server 200 or the like via the communication network 400. As the communication unit 104, a well-known communication device based on a communication method applied to the communication network 400 can be applied. That is, if a LAN is used as the communication network 400, a communication device based on the LAN can be used as the communication unit 104.

The system controller 105 integrally controls the respective components configuring the multi-function peripheral 100 in order to implement a predetermined operation as the multi-function peripheral 100. The predetermined operation as the multi-function peripheral 100 is, for example, an operation for implementing various well-known functions that are implemented by an existing MFP, and functions to be described below.

The control panel 106 includes an input device and a display device. The control panel 106 inputs an instruction of an operator through an input device. The control panel 106 displays various information to be notified to the operator using the display device. As the control panel 106, for example, a touch panel, various switches, or various lamps can be used by itself or appropriately in combination.

The tag reader/writer 103 includes a signal processing unit 1031, a transmission unit 1032, an antenna duplexer 1033, an antenna 1034, a reception unit 1035, a control unit 1036, and an interface unit 1037.

The signal processing unit 1031 generates a transmission signal in a baseband for emitting a predetermined radio wave and transmits the transmission signal to the transmission unit 1032. The signal processing unit 1031 extracts transmission data from tags 501 and 502 from a reception signal in a baseband transmitted from the reception unit 1035. The tag 501 is an RFID tag attached to print paper. The tag 502 is an RFID tag built in an ID card.

The transmission unit 1032 converts the transmission signal in the baseband transmitted from the signal processing unit 1031 into a transmission signal in a wireless band. The transmission unit 1032 has a function of changing the level of the transmission signal to adjust the transmission intensity of a radio wave from the antenna 1034.

The antenna duplexer 1033 supplies the transmission signal transmitted from the transmission unit 1032 to the antenna 1034. The antenna duplexer 1033 transmits the reception signal output from the antenna to the reception unit 1035.

The antenna 1034 emits a radio wave corresponding to the transmission signal supplied from the antenna duplexer 1033 to a space. The antenna 1034 receives a response wave from the tags 501 and 502 and outputs an electrical reception signal to the antenna duplexer 1033.

The reception unit 1035 converts a reception signal in a wireless band transmitted from the antenna duplexer 1033 into a reception signal in a baseband, and outputs the reception signal in the baseband to the signal processing unit 1031. The reception unit 1035 has a function of measuring a received signal strength indicator (RSSI). The reception unit 1035 has a function of outputting the reception signal only if the measured RSSI is more than or equal to a predetermined reception threshold. Further, the reception unit 1035 has a function of changing the threshold in response to an instruction from the control unit 1036. Thus, the reception unit 1035 has a function of changing the reception sensitivity.

The control unit 1036 controls the signal processing unit 1031 such that an operation of writing data into the tags 501 and 502 and an operation of reading data from the tags 501 and 502 are executed at required timings under the control of the system controller 105. The control unit 1036 controls the start/stop of operations of the signal processing unit 1031, the transmission unit 1032, and the reception unit 1035 under the control of the system controller 105. The control unit 1036 controls operation states of the transmission unit 1032 and the reception unit 1035 such that the transmission output and the reception sensitivity change under the control of the system controller 105.

The interface unit 1037 mediates transmission and reception of data to and from the system controller 105.

The system controller 105 includes a processor 1051, a main memory 1052, an auxiliary storage unit 1053, an interface unit 1054, and a transmission line 1055.

The processor 1051, the main memory 1052, and the auxiliary storage unit 1053 are connected via the transmission line 1055 such that a computer that executes information processing for integrally controlling each of the units configuring the MFP 100 is configured.

The processor 1051 corresponds to a central part of the computer. The processor 1051 executes information processing described below in accordance with an information processing program such as an operating system, middleware, or an application program. The processor 1051 includes, for example, a central processing unit (CPU) and an application-specific integrated circuit (ASIC).

The main memory 1052 corresponds to a main memory part of the computer. The main memory 1052 includes a read-only memory region and a rewritable memory region. The main memory 1052 stores a part of the information processing program in the read-only memory region. In addition, the main memory 1052 may also store data required to execute a process for allowing the processor 1051 to control the respective units in the read-only memory region or the rewritable memory region. The main memory 1052 uses the rewritable memory region as a work area for the processor 1051.

The auxiliary storage unit 1053 corresponds to an auxiliary storage part of the above-described computer. As the auxiliary storage unit 1053, for example, various well-known storage devices such as an electric erasable programmable read-only memory (EEPROM), a hard disk drive (HDD), or a solid state drive (SSD) can be used by itself or in combination. The auxiliary storage unit 1053 stores data used for the processor 1051 to execute various processes and data generated during a process of the processor 1051. The auxiliary storage unit 1053 may also store the information processing program. In the embodiment, the auxiliary storage unit 1053 stores a control program PRA. The control program PRA is an information processing program described regarding the information processing for controlling the MFP 100.

The interface unit 1054 mediates transmission and reception of data to and from the scanner 101, the printer 102, the tag reader/writer 103, the communication unit 104, the control panel 106, and the like.

The transmission line 1055 includes an address bus, a data bus, and a control signal line, and transmits data and a control signal to be transmitted and received between the respective parts connected to each other.

In general, the multi-function peripheral 100 is assigned in a state where the control program PRA is stored in the auxiliary storage unit 1053. However, hardware in a state where the control program PRA is not stored in the auxiliary storage unit 1053 or in a state where an application program having the same type but a different version is stored in the auxiliary storage unit 1053 and the control program PRA may be individually assigned. By writing the control program PRA into the auxiliary storage unit 1053 in accordance with an operation of any operator, the multi-function peripheral 100 may be configured. This configuration is, for example, a case where the tag reader/writer 103 is provided as an optional unit separated from the main body of the multi-function peripheral 100 and a control program not corresponding to the tag reader/writer 103 is replaced with the control program PRA. The control program PRA can be assigned through communication via a network or a removable recording medium such as a magnetic disk, a magneto-optic disk, an optical disk, or a semiconductor memory in which the control program PRA is recorded.

Figure 4:
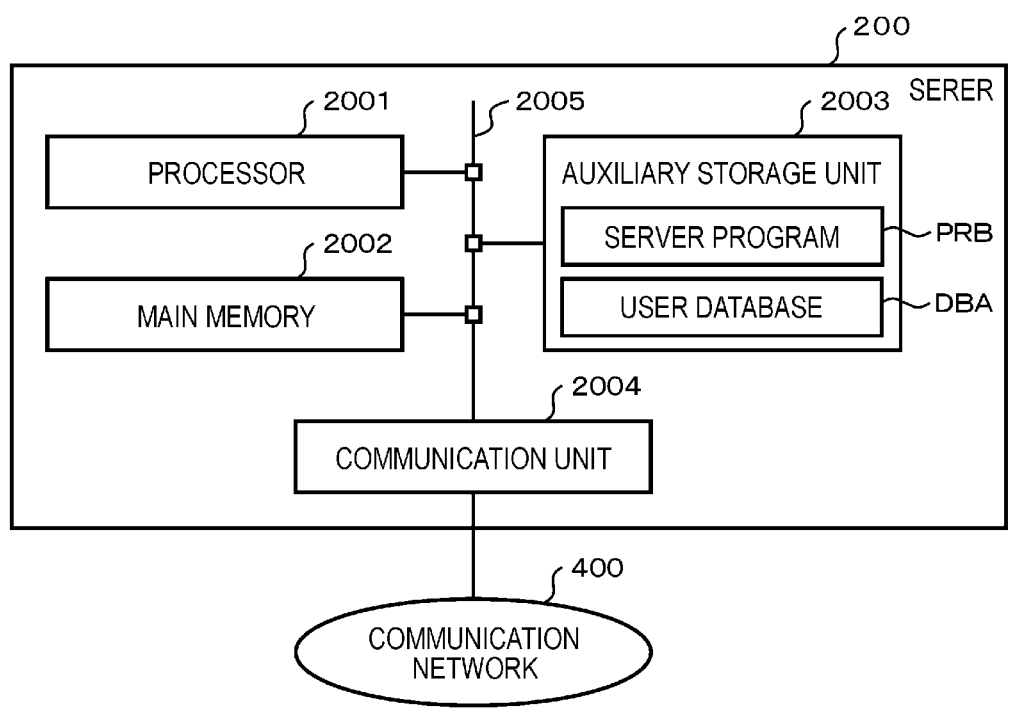
FIG. 4 is a block diagram illustrating a main circuit configuration of a server illustrated in FIG. 1.

FIG. 4 is a block diagram illustrating a main circuit configuration of the server 200.

The server 200 includes a processor 2001, a main memory 2002, an auxiliary storage unit 2003, a communication unit 2004, and a transmission line 2005. The processor 2001, the main memory 2002, the auxiliary storage unit 2003, and the communication unit 2004 can communicate with each other via the transmission line 2005.

The processor 2001, the main memory 2002, and the auxiliary storage unit 2003 are connected via the transmission line 2005 such that a computer that executes information processing for controlling the server 200 is configured.

The processor 2001 corresponds to a central part of the computer. The processor 2001 executes information processing for controlling the respective units to implement various functions as the server 200 in accordance with an information processing program such as an operating system or an application program.

The main memory 2002 corresponds to a main memory part of the computer. The main memory 2002 includes a read-only memory region and a rewritable memory region. The main memory 2002 stores a part of the information processing program in the read-only memory region. In addition, the main memory 2002 may also store data required to execute a process for allowing the processor 2001 to control the respective units in the read-only memory region or the rewritable memory region. The main memory 2002 uses the rewritable memory region as a work area for the processor 2001.

The auxiliary storage unit 2003 corresponds to an auxiliary storage part of the above-described computer. As the auxiliary storage unit 2003, for example, an EEPROM, an HDD, an SSD, or other various storage devices can be used. The auxiliary storage unit 2003 stores data used for the processor 2001 to execute various processes and data generated during a process of the processor 2001. The auxiliary storage unit 2003 may also store the above-described information processing program. In the embodiment, the auxiliary storage unit 2003 stores a server program PRB that is one information processing program. The server program PRB is an application program described regarding a procedure of a process described below for executing an operation as a printer server. A part of the storage area of the auxiliary storage unit 2003 is used as an area that stores a user database DBA. The user database DBA is a database for managing users of the multi-function peripheral 100. The user database DBA is a set of data records correlated with the users of the multi-function peripheral 100. In one data record, a first identifier for identifying the correlated user with the multi-function peripheral 100 and a second identifier for identifying the same user with the user terminal 300 are linked to each other. The first identifier is stored in the tag 502 built in an ID card that is held by the user. The second identifier is determined irrespective of the first identifier.

The communication unit 2004 executes communication processing for data communication via the communication network 400. As the communication unit 2004, a well-known communication device based on a communication method applied to the communication network 400 can be applied. That is, if a LAN is used as the communication network 400, a communication device based on the LAN can be used as the communication unit 2004.

The transmission line 2005 includes an address bus, a data bus, and a control signal line, and transmits data and a control signal to be transmitted and received between the respective parts connected to each other.

As hardware of the server 200, for example, a general-purpose server apparatus can be used. In general, the server 200 may be assigned in a state where the server program PRB is stored in the auxiliary storage unit 2003 and the user database DBA is not stored in the auxiliary storage unit 2003. However, hardware in a state where the server program PRB is not stored in the auxiliary storage unit 2003 or in a state where an application program having the same type but a different version is stored in the auxiliary storage unit 2003 and the server program PRB may be individually assigned. By writing the server program PRB into the auxiliary storage unit 2003 in accordance with an operation of an operator, the server 200 may be configured. The server program PRB can be assigned through communication via a network or a removable recording medium such as a magnetic disk, a magneto-optic disk, an optical disk, or a semiconductor memory in which the control program PRA is recorded.

Next, an operation of the image forming process system configured as described above will be described. The content of various operations and processes described below is merely exemplary and, for example, change in the order of a part of the operations of the processes, omission of a part of the operations of the processes, or addition of another operation and another process can be appropriately made. For example, in the following description, for easy understanding of the characteristic operation of the embodiment, a part of the process will not be described. For example, if an error occurs, a process for dealing with the error may be executed, but a part of the process will not be described.

If the plurality of multi-function peripherals 100 are in an operation state for providing various functions to the users, each of the processors 1051 in the system controllers 105 executes information processing (hereinafter, referred to as "control process") based on the control program PRA. That is, the plurality of multi-function peripherals 100 also operate in the control process described below. Therefore, the operation of one multi-function peripheral 100 will be described below.

Figure 5:
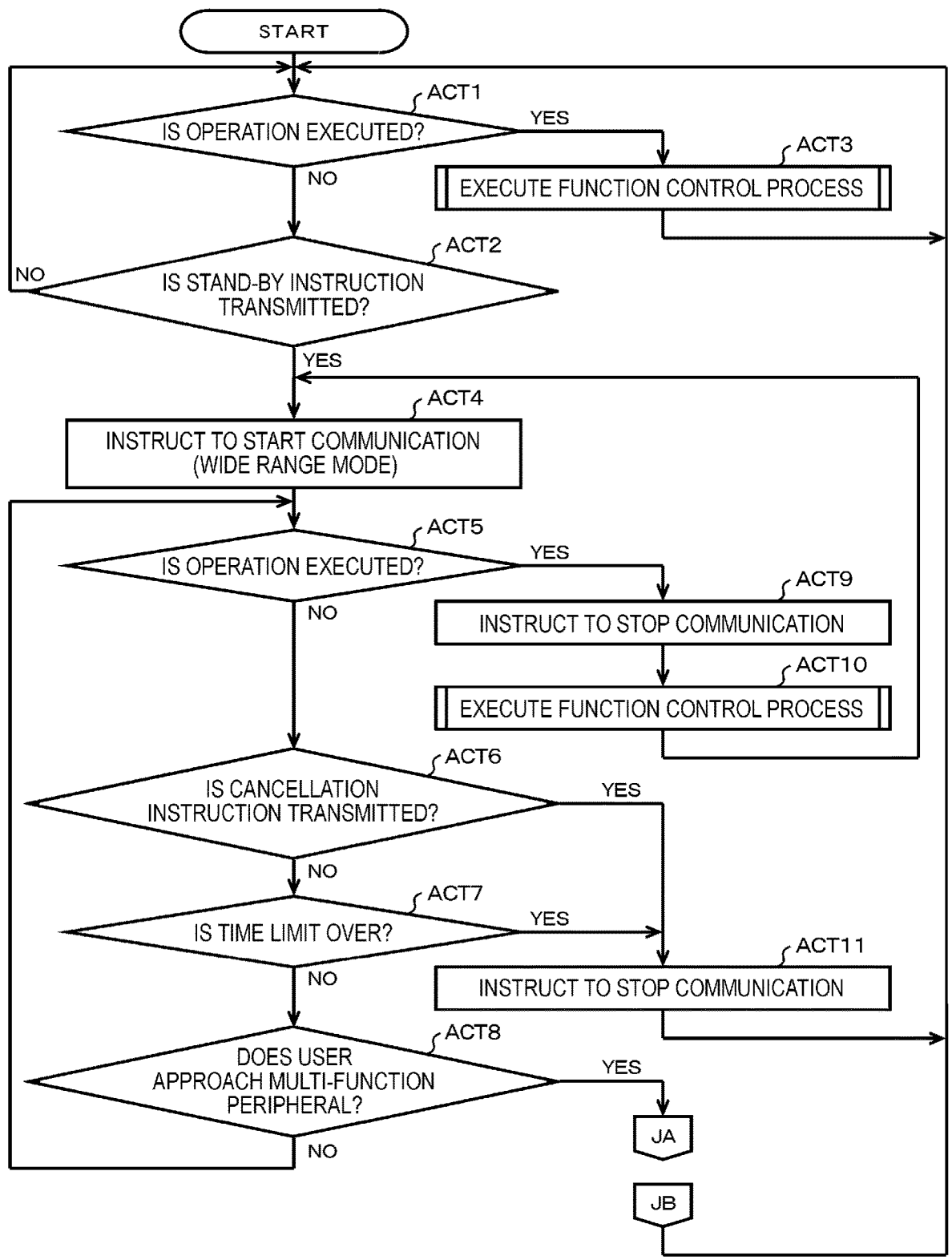
FIG. 5 is a flowchart illustrating a procedure in a control process by a processor illustrated in FIG. 3.
Figure 6:
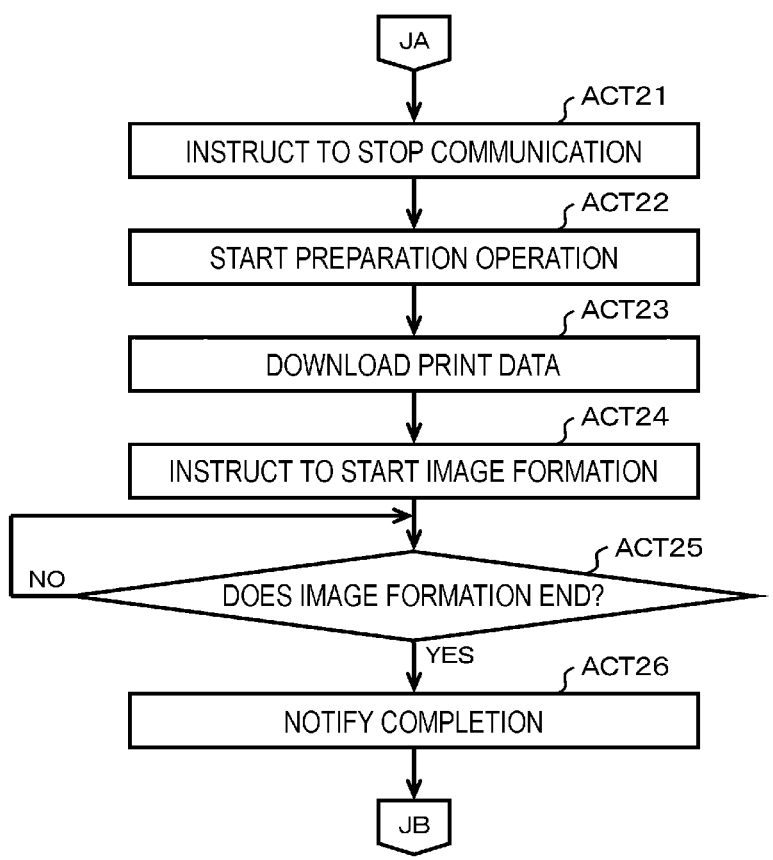
FIG. 6 is a flowchart illustrating a procedure in the control process by the processor illustrated in FIG. 3.

FIGS. 5 and 6 are flowcharts illustrating a procedure of the processor 1051 in the control process.

In ACT 1, the processor 1051 checks whether or not the user executes any operation in the control panel 106. If the event cannot be checked, the processor 1051 determines NO and proceeds to ACT 2.

In ACT 2, the processor 1051 checks whether or not a stand-by instruction is transmitted from the server 200 as described below. If the event cannot be checked, the processor 1051 determines NO and returns to ACT 1.

Thus, the processor 1051 stands by until the operation is executed by the user or the stand-by instruction is transmitted.

If the user uses some function such as the copying function of the multi-function peripheral 100, the user approaches the multi-function peripheral 100 and starts a predetermined operation through the control panel 106 for designating the function to be used. If the operation is notified from the control panel 106 to the system controller 105, the processor 1051 determines YES in ACT 1 and proceeds to ACT 3.

In ACT 3, the processor 1051 executes a function control process. The function control process is a process for allowing each of the units to execute a job for executing a function that the user wants to use.

Figure 7:
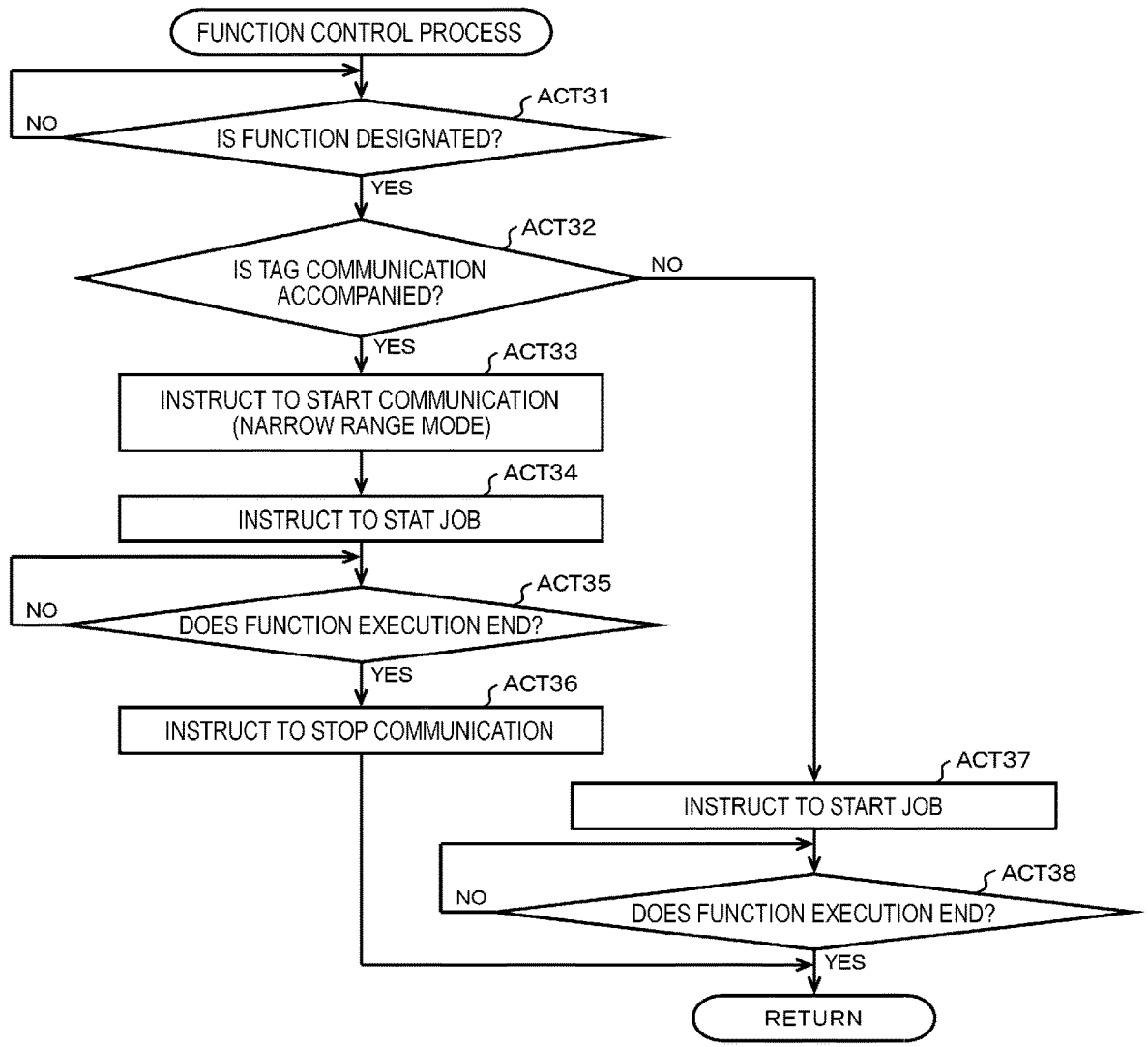
FIG. 7 is a flowchart illustrating a procedure in the control process by the processor illustrated in FIG. 3.

FIG. 7 is a flowchart illustrating an example of the procedure of the processor 1051 in the function control process.

In ACT 31, the processor 1051 stands by until the function to be executed is designated by the user. If the operation for designating the function is executed by the user as described above, the processor 1051 determines YES and proceeds to ACT 32.

In ACT 32, the processor 1051 checks whether or not the job for executing the designated function includes a job that is accompanied by communication with the tag 501. For example, if the predetermined function such as the RFID print function is designated, the processor 1051 determines YES and that the job is accompanied by the communication with the tag 501, and proceeds to ACT 33.

In ACT 33, the processor 1051 instructs the tag reader/writer 103 to start the communication in a narrow range mode. The processor 1051 outputs, for example, a predetermined command for the instruction from the interface unit 1054 to the tag reader/writer 103.

Until the communication start is instructed, the tag reader/writer 103 stops the operations of the signal processing unit 1031, the transmission unit 1032, and the reception unit 1035 and does not execute transmission and reception. If the communication start is instructed, the control unit 1036 operates the signal processing unit 1031, the transmission unit 1032, and the reception unit 1035 and proceeds to a state where transmission and reception can be executed. Here, since the narrow range mode is designated, the control unit 1036 sets the operation state of the transmission unit 1032 such that the transmission intensity is a predetermined first transmission intensity, and sets the operation state of the reception unit 1035 such that a first reception threshold is used as the reception threshold. The first transmission intensity is predetermined to be suitable for allowing the tag 501 to receive a radio wave emitted from the antenna 1034 with a required intensity, the tag 501 being positioned in a predetermined range if the tag 501 is conveyed into the printer 102 for the image formation in the printer 102. The above-described range is, for example, a range from the registration roller 14 to the fixing unit 3. The first reception threshold is determined to be about a minimum value assumed for the RSSI obtained with respect to a reflected wave from the tag 501 positioned in the above-described range. The first transmission intensity and the first reception threshold are appropriately determined by a designer or the like of the multi-function peripheral 100 in consideration of communication characteristics and the like between the tag reader/writer 103 and the tag 501 positioned in the above-described range. The distance between the tag 501 positioned in the above-described range and the antenna 1034 is, for example, about several centimeters to several tens of centimeters. The first transmission intensity and the first reception threshold are determined to be suitable for the communication distance. Thus, the communicable range in the narrow range mode is a narrow range where the distance from the multi-function peripheral 100 is not large.

In ACT 34, the processor 1051 instructs each of the units to start one or a plurality of jobs for executing the designated function. For example, if the RFID print function of writing data into the tag 501 attached to the same print paper in cooperation with the image formation on the print paper is designated, the processor 1051 instructs the printer 102 to start an image formation job, and instructs the tag reader/writer 103 to start a data writing job into the tag 501. In response to the instruction, each of the units that receives the instruction executes a predetermined job. Thus, by the processor 1051 executing the information processing based on the control program PRA, a computer including the processor 1051 as a central part functions as the reader/writer unit.

In ACT 35, the processor 1051 stands by until the function execution by the one or the plurality of jobs started as described above ends. If the function execution ends, the processor 1051 determines YES and proceeds to ACT 36.

In ACT 36, the processor 1051 instructs the tag reader/writer 103 to stop the communication. In response to the instruction, the control unit 1036 in the tag reader/writer 103 stops the operations of the signal processing unit 1031, the transmission unit 1032, and the reception unit 1035 and returns to the state where transmission and reception are not executed. Next, the processor 1051 ends the function control process and returns to the stand-by state of ACT 1 and ACT 2 in FIG. 5.

Incidentally, if another function other than the predetermined function is designated, the processor 1051 determines NO in ACT 32 and that the job is not accompanied by the communication with the tag 501, and proceeds to ACT 37.

In ACT 37, the processor 1051 instructs to start the job as in ACT 34.

In ACT 38, the processor 1051 stands by until the function execution ends. If the function execution ends, the processor 1051 determines YES, the processor 1051 ends the function control process and returns to the stand-by state of ACT 1 and ACT 2 in FIG. 5.

That is, during the execution of the function that is not accompanied by the communication with the tag 501, the tag reader/writer 103 stops the operations of the signal processing unit 1031, the transmission unit 1032, and the reception unit 1035 and is maintained in the state where transmission and reception are not executed.

If the user wants to print a document managed by the user terminal 300 using the multi-function peripheral 100, the user can execute a predetermined operation in the user terminal 300 to instruct the printing.

Figure 8:
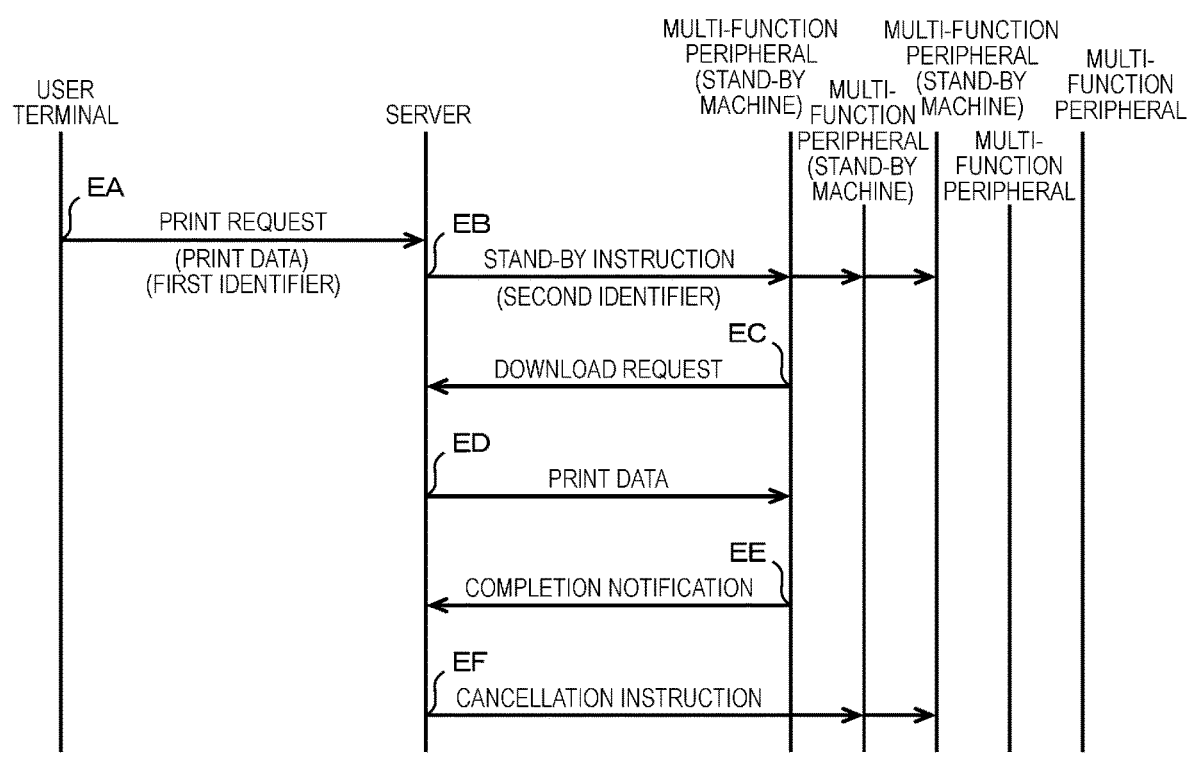
FIG. 8 is a diagram illustrating a sequence of communication between the server and a user terminal.

FIG. 8 is a diagram illustrating a sequence of communication between the multi-function peripheral 100, the server 200, and the user terminal 300 in response to the printing instruction in the user terminal 300.

In response to the printing instruction, the user terminal 300 requests the server 200 to execute printing as an event EA. The user terminal 300 notifies print data regarding the document to be printed to the server 200 in response to the print request. In addition, the user terminal 300 notifies the first identifier of the user that is acquired, for example, if an input is received from the user during sign-in to the server 200 in response to the print request. The server 200 stores the notified print data and the notified first identifier in the main memory 2002 or the auxiliary storage unit 2003. Thus, the main memory 2002 or the auxiliary storage unit 2003 corresponds to the storage unit correlating the print data with the first identifier that is the identifier of the user and to store the correlated data.

If the print request is received, the server 200 selects a part or all of the plurality of multi-function peripherals 100 as stand-by machines that stand-by for the approach of the user in accordance with a predetermined rule. The server 200 instructs the multi-function peripherals 100 selected as the stand-by machines to stand-by as an event EB. The server 200 notifies the second identifier linked to the first identifier in the user database DBA that is notified in response to the print request to the multi-function peripherals 100 selected as the stand-by machines in response to the stand-by instruction. The execution of the process that is executed by the server 200 as described herein and a process that is executed by the server 200 as described below is actually implemented by the processor 2001 executing information processing based on the server program PRB. Thus, by the processor 2001 executing the information processing based on the server program PRB, a computer including the processor 2001 as a central part functions as the instruction unit.

The selection rule is determined as, for example, "the multi-function peripheral 100 of which the distance from the position of the user terminal 300 is less than or equal to a predetermined distance during the print request is selected as the stand-by machine". In this case, for example, the auxiliary storage unit 2003 of the server 200 stores a position database in which three-dimensional coordinates or two-dimensional coordinates representing an installation position of each of the multi-function peripherals 100 and the user terminals 300 are recorded. For example, the processor 2001 determines the multi-function peripheral 100 positioned at the predetermined distance or less from the position of the user terminal 300 that transmits the print request with reference to the position database, and selects the multi-function peripheral 100 as the stand-by machine. If the user terminal 300 is a mobile terminal, for example, the position of a wireless access point used for access to the communication network 400 in response to the print request may be determined as the position of the user terminal 300. The selection rule may be freely determined by, for example, a developer of the server program PRB or a manager of the server 200. As another example of the selection rule, "the multi-function peripheral 100 that is predetermined for each of the user terminals 300 is selected as the stand-by machine" or "all of the multi-function peripherals 100 are selected as the stand-by machines unconditionally" is assumed.

In the multi-function peripheral 100 that receives the stand-by instruction, the processor 1051 in the system controller 105 determines YES in ACT 2 in FIG. 5 and proceeds to ACT 4.

In ACT 4, the processor 1051 instructs the tag reader/writer 103 to start the communication in a wide range mode.

If the tag reader/writer 103 is instructed to start the communication, the control unit 1036 operates the signal processing unit 1031, the transmission unit 1032, and the reception unit 1035 and proceeds to a state where transmission and reception can be executed. Here, since the wide range mode is designated, the control unit 1036 sets the operation state of the transmission unit 1032 such that the transmission intensity is a predetermined second transmission intensity, and sets the operation state of the reception unit 1035 such that a second reception threshold is used as the reception threshold. The second transmission intensity is predetermined to be suitable for allowing the tag 502 to receive a radio wave emitted from the antenna 1034 with a required intensity, the tag 502 being positioned in a predetermined detection range around the multi-function peripheral 100. The detection range is assumed to be, for example, a range of several meters to 10 meters with respect to the multi-function peripheral 100. The second reception threshold is determined to be about a minimum value assumed for the RSSI obtained with respect to a reflected wave from the tag 502 positioned in the detection range. The second transmission intensity and the second reception threshold are appropriately determined by a designer or the like of the multi-function peripheral 100 in consideration of communication characteristics and the like between the tag reader/writer 103 and the tag 502 positioned in the detection range. The size of the detection range can be freely set by a manager or the like of the multi-function peripheral 100, and the second transmission intensity and the second reception threshold may change depending on the set size of the detection range. Thus, the communicable range in the wide range mode is a range around the multi-function peripheral 100 including positions at a distance of several meters to about 10 meters from the multi-function peripheral 100, which is wider than that in the narrow range mode.

Accordingly, the second transmission intensity and the second reception threshold are more than the first transmission intensity and the first reception threshold. By changing the transmission intensity and the reception threshold depending on whether the processor 1051 designates the narrow range mode or the wide range mode, the processor 1051 changes the size of the communicable range. Thus, by the processor 1051 executing the information processing based on the control program PRA, a computer including the processor 1051 as a central part functions as the communication control unit.

In ACT 5, the processor 1051 checks whether or not the user executes any operation in the control panel 106. If the event cannot be checked, the processor 1051 determines NO and proceeds to ACT 6.

In ACT 6, the processor 1051 checks whether or not a cancellation instruction is transmitted from the server 200 as described below. If the event cannot be checked, the processor 1051 determines NO and proceeds to ACT 7.

In ACT 7, the processor 1051 checks whether or not a predetermined time limit for the stand-by state that starts if the tag reader/writer 103 is instructed to start the communication in ACT 4 is over. If the event cannot be checked, the processor 1051 determines NO and proceeds to ACT 8.

In ACT 8, the processor 1051 checks whether or not the user approaches the multi-function peripheral 100. If the event cannot be checked, the processor 1051 determines NO and returns to ACT 5.

Thus, the processor 1051 stands by until the operation is executed by the user, the cancellation instruction is transmitted, the time limit is over, or the user approaches the multi-function peripheral 100. An operation state of the multi-function peripheral 100 in which the processor 1051 is in the stand-by state in ACT 5 to ACT 8 will be referred to as "stand-by state".

Even if the tag reader/writer 103 reads the second identifier from the tag 502, if the second identifier does not match with the second identifier notified in ACT 4, the processor 1051 does not determine YES in ACT 8. In addition, if the user who approaches the multi-function peripheral 100 does not hold an ID card, the second identifier is not read from the tag 502, and the processor 1051 does not determine YES in ACT 8. That is, in this case, the processor 1051 does not determine the approach in ACT 8 even if the user approaches the multi-function peripheral 100. With this configuration, if the user who approaches the multi-function peripheral 100 executes the operation through the control panel 106 to use the function of the multi-function peripheral 100, the processor 1051 determines YES in ACT 5 and proceeds to ACT 9.

In ACT 9, the processor 1051 instructs the tag reader/writer 103 to stop the communication. In response to the instruction, the control unit 1036 in the tag reader/writer 103 stops the operations of the signal processing unit 1031, the transmission unit 1032, and the reception unit 1035 and returns to the state where transmission and reception are not executed. As a result, the multi-function peripheral 100 is not in the stand-by state.

In ACT 10, the processor 1051 executes the function control process in the procedure illustrated in FIG. 7 as in ACT 3. If the function control process ends, the processor 1051 returns to the stand-by state in ACT 5 to ACT 8 through ACT 4 without returning to the stand-by state in ACT 1 and ACT 2 in FIG. 5, and the multi-function peripheral 100 returns to the stand-by state. That is, if the multi-function peripheral 100 is in the stand-by state, if another user different from the user who is identified by the second identifier notified in response to the stand-by instruction starts to use the multi-function peripheral 100, the processor 1051 temporarily stops the operation of the tag reader/writer 103 to cancel the stand-by state, but returns to the stand-by state after the end of the use.

If the user who instructs printing or another user who holds an ID card approaches the multi-function peripheral 100 and a radio wave transmitted from the antenna 1034 sufficiently reaches the tag 502 built in the ID card, the tag 502 responds to this transmitted radio wave and emits a response wave including the stored second identifier. This response wave is received by the reception unit 1035 through the antenna 1034 and the antenna duplexer 1033, and then the second identifier is extracted by the signal processing unit 1031. Further, the second identifier extracted as described above is notified to the system controller 105 by the control unit 1036. Next, the processor 1051 in the system controller 105 compares the second identifier notified as described above and the second identifier notified in ACT 4 to each other. If the second identifiers match with each other, the processor 1051 determines YES in ACT 8 and that the user who instructs printing approaches the multi-function peripheral 100, and proceeds to ACT 21 in FIG. 6.

If another user different from the user who instructs printing approaches the multi-function peripheral 100, the second identifier notified to the system controller 105 by the control unit 1036 and the second identifier notified in ACT 4 do not match with each other. Therefore, the processor 1051 does not determine the approach of the user.

Thus, if the second identifier read from the tag 502 using the tag reader/writer 103 satisfies the condition that the second identifier matches with the second identifier notified in response to the stand-by instruction, the processor 1051 determines the approach of the user. Thus, by the processor 1051 executing the information processing based on the control program PRA, a computer including the processor 1051 as a central part functions as the determination unit.

In ACT 21, the processor 1051 instructs the tag reader/writer 103 to stop the communication. In response to the instruction, the control unit 1036 in the tag reader/writer 103 stops the operations of the signal processing unit 1031, the transmission unit 1032, and the reception unit 1035 and returns to the state where transmission and reception are not executed. That is, if the processor 1051 verifies the approach of the user for which the multi-function peripheral 100 stands by, the processor 1051 cancels the stand-by state.

In ACT 22, the processor 1051 starts a preparation operation for starting the image formation. For example, the processor 1051 causes the printer 102 to start warm-up. Thus, by the processor 1051 executing the information processing based on the control program PRA, a computer including the processor 1051 as a central part functions as the preparation control unit.

In ACT 23, the processor 1051 downloads print data from the server 200. For example, the processor 1051 accesses the server 200 through the communication network 400 and requests the download as an event EC in FIG. 8. In response to the download request, the server 200 transmits the print data stored as described above to the multi-function peripheral 100 that is the request source as an event ED. Thus, by the processor 1051 executing the information processing based on the control program PRA, a computer including the processor 1051 as a central part functions as the acquisition unit.

In ACT 24, the processor 1051 instructs the printer 102 to start image formation based on the downloaded print data. In response to the instruction, the printer 102 stands by until the warm-up ends, and starts the image formation. Thus, by the processor 1051 executing the information processing based on the control program PRA, a computer including the processor 1051 as a central part functions as the print control unit.

In ACT 25, the processor 1051 stands by until the image formation ends. If the function execution ends, the processor 1051 determines YES and that the image formation ends, and proceeds to ACT 26.

In ACT 26, the processor 1051 notifies the completion of printing to the server 200. The processor 1051 returns to the stand-by state in ACT 1 and ACT 2 in FIG. 5.

The completion notification from the multi-function peripheral 100 to the server 200 is executed as an event EE in ACT 8. If the completion notification is received, as an event EF, the server 200 transmits the cancellation instruction to the multi-function peripheral 100 that is different from the multi-function peripheral 100 that receives the completion notification among the multi-function peripherals 100 that receive the stand-by instruction in the event EB.

If the processor 1051 is in the stand-by state in ACT to ACT 8 in FIG. 5, if the cancellation instruction is received from the server 200, the processor 1051 determines YES in ACT 6 and proceeds to ACT 11. In addition, if the cancellation instruction is received from the server 200 during the execution of ACT 9 and ACT 10, the processor 1051 returns to the stand-by state in ACT 5 to ACT 8 after the end of ACT 10, and determines YES in ACT 6.

In addition, if the processor 1051 is in the stand-by state in ACT 5 to ACT 8 in FIG. 5, if the time limit is over in a state where the processor 1051 does not determine YES in ACT 5, ACT 6, or ACT 8 as described above, the processor 1051 determines YES and that time limit is over in ACT 7, and proceeds to ACT 11.

In ACT 11, the processor 1051 instructs the tag reader/writer 103 to stop the communication. In response to the instruction, the control unit 1036 in the tag reader/writer 103 stops the operations of the signal processing unit 1031, the transmission unit 1032, and the reception unit 1035 and returns to the state where transmission and reception are not executed. The processor 1051 returns to the stand-by state in ACT 1 and ACT 2. Thus, the processor 1051 cancels the stand-by state in response to the cancellation instruction or if the time limit is over.

As described above, the multi-function peripheral 100 executes both of the communication for the operations of reading and writing data from and to the tag 501 attached to the print paper and the communication for detecting the approach of the user with the tag 502 that is held by the user using the tag reader/writer 103. As a result, a dedicated device for detecting the approach of a user does not need to be provided while providing a function for the detection. Further, since a person who does not hold the tag 502 is not detected as the user, the possibility of erroneous detection of the approach of a person who is not the user to be detected as the approach of the user can be reduced.

In addition the multi-function peripheral 100 changes the size of the communicable range of the tag reader/writer 103 depending on whether the operation to be executed is the reading or writing operation for the tag 501 or the operation of detecting the approach of the user. As a result, the approach of the user at a distant position from the multi-function peripheral 100 can be detected, and during the reading or writing operation for the tag 501, communication with the tag 501 that is positioned outside of the multi-function peripheral 100 and is not a target to be read or written can be prevented.

In addition, if the multi-function peripheral 100 is in the stand-by state for the approach of the user, the multi-function peripheral 100 starts the preparation operation such as the warm-up of the printer 102. Thus, the multi-function peripheral 100 can proceed the preparation operation while the user is moving to the multi-function peripheral 100, and the waiting time from the approach of the user toward the multi-function peripheral 100 to the start of the image formation can be reduced.

In addition, in the image forming process system according to the embodiment, the server 200 selects the multi-function peripheral 100 as the stand-by machine from the plurality of multi-function peripherals 100, and only the multi-function peripheral 100 as the stand-by machine stands by for the approach of the user in response to the instruction from the server 200. Thus, for example, only the multi-function peripheral 100 that is assumed to be used by the user can be made to stand by, and time and effort required to execute the unnecessary stand-by operation can be saved.

In addition, in the image forming process system according to the embodiment, the multi-function peripheral 100 that the user who instructs printing approaches downloads print data to be printed in response to the printing instruction from the user from the server 200. Thus, unnecessary transfer of print data in the image forming process system is not executed.

This embodiment can be modified as follows in various ways.

The server 200 may receive an instruction of the user other than the printing instruction. For example, the server 200 may receive announcement of the user for the user of the copying function as the instruction of the user. In this case, although the download of print data is unnecessary, the stand-by instruction is transmitted from the server 200 to the multi-function peripheral 100 such that the preparation operation of the multi-function peripheral 100 starts. As a result, if the user approaches the multi-function peripheral to use the copying function, the preparation operation is already proceeded, and the waiting time of the user for the use of the copying function can be reduced.

In the multi-function peripheral 100, in a period where communication with the tag 501 is unnecessary, the tag reader/writer 103 can execute communication in the wide range mode continuously or intermittently. If any second identifier is read by the tag reader/writer 103, the preparation operation may start. With this configuration, the preparation operation may start if the user who holds an ID card approaches the multi-function peripheral 100. If the user approaches and starts to use the multi-function peripheral 100, the preparation operation is already proceeded, and the waiting time of the user for the use of various functions can be reduced.

The multi-function peripheral 100 or the server 200 may store data representing a list of the second identifiers such that the condition for determining the approach can be appropriately changed. For example, if the second identifier read by the tag reader/writer 103 is included in the list, the multi-function peripheral 100 or the server 200 determines that the user is detected.

The functions of the server 200 may be included in the multi-function peripheral 100.

The above-described embodiment is applicable to various apparatuses other than the MFP, for example, a copying machine, a printer, or a facsimile apparatus as long as an image can be formed in the apparatuses.

The number of image forming units is not limited to four as long as at least one image forming unit is provided.

For example, an image forming apparatus that forms an image using another method such as an ink-jet method different from an electrophotographic method may be used.

A part or all of the respective functions that are implemented by the processor 1051 through the information processing can also be implemented by hardware that executes information processing not based on a program, for example, a logic circuit. In addition, each of the respective functions can also be implemented by a combination of the hardware such as a logic circuit and a software control.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such embodiments or modifications as would fall within the scope and spirit of the inventions.

What is claimed is:

1. An image forming apparatus, comprising:
a forming component configured to execute image formation that comprises forming an image on a print medium;
a communication component configured to wirelessly communicate with wireless tags;
a reader/writer configured to execute, if the forming component executes the image formation on the print medium, using the communication component, one of at least an operation of writing data into a first wireless tag attached to the print medium on which the image formation is to be executed or an operation of reading data from the first wireless tag attached to the print medium on which the image formation is to be executed;
a reader configured to read, if the image formation that is accompanied by one of at least the operation of writing data or the operation of reading data by the reader/writer is not executed, an identifier of a user from a second wireless tag that stores the identifier using the communication component if communication between the second wireless tag and the communication component is enabled; and
a determination component configured to determine that the user approaches the image forming apparatus if the identifier read by the reader satisfies a predetermined condition,
the reader/writer is configured to change an output intensity or a received threshold based on whether the image formation that is accompanied by one of at least the operation of writing data or the operation of reading data by the reader/writer is executed or is not executed.

2. The image forming apparatus according to claim 1, further comprising a communication controller configured to control, if the reader reads the identifier of the user from the second wireless tag that stores the identifier, the communication component such that a communicable range of the communication component is wider than that if the reader/writer executes one of at least the operation of writing data into the first wireless tag attached to the print medium or the operation of reading data from the first wireless tag attached to the print medium.

3. The image forming apparatus according to claim 1, further comprising a preparation controller configured to control the forming component such that a preparation operation for the image formation by the forming component starts if the determination component determines that the user approaches the image forming apparatus.

4. The image forming apparatus according to claim 1, wherein the reader/writer comprises a signal processor, a transmission component, an antenna duplexer, an antenna, a reception component, a controller, and an interface component.

5. The image forming apparatus according to claim 1, wherein the forming component has a color printing function and a monochrome printing function.

6. An image forming system comprising a plurality of image forming apparatuses and a server,
wherein each image forming apparatus of the plurality of image forming apparatuses comprises:

a forming component configured to execute image formation that comprises forming an image on a print medium, a communication component configured to wirelessly communicate with wireless tags, a reader/writer configured to execute, if the forming component executes the image formation on the print medium, using the communication component, one of at least an operation of writing data into a first wireless tag attached to the print medium on which the image formation is to be executed or an operation of reading data from the first wireless tag attached to the print medium on which the image formation is to be executed, a reader configured to read, if the image formation that is accompanied by one of at least the operation of writing data or the operation of reading data by the reader/writer is not executed, an identifier of a user from a second wireless tag that stores the identifier using the communication component if communication between the second wireless tag and the communication component is enabled, and a determination component configured to determine that the user approaches the image forming apparatus if the identifier read by the reader satisfies a predetermined condition, the reader/writer is configured to change an output intensity or a received threshold based on whether the image formation that is accompanied by one of at least the operation of writing data or the operation of reading data by the reader/writer is executed or is not executed, and the server comprises:

an instruction component configured to select, if the predetermined condition is satisfied, one or more image forming apparatuses among the plurality of image forming apparatuses and to instruct the selected one or more image forming apparatuses to stand by for the approach of the user.

7. The image forming system according to claim 6, wherein the predetermined condition comprises a selection rule based upon a multi-function peripheral of which a distance from a position of a user terminal is less than or equal to a predetermined distance while a print request is selected as a stand-by machine.

8. The image forming system according to claim 6, wherein the reader/writer comprises a signal processor, a transmission component, an antenna duplexer, an antenna, a reception component, a controller, and an interface component.

9. The image forming system according to claim 6, wherein the forming component has a color printing function and a monochrome printing function.

10. The image forming system according to claim 6, wherein each image forming apparatus of the plurality of image forming apparatuses further comprises a communication controller configured to control, if the reader reads the identifier of the user from the second wireless tag that stores the identifier, the communication component such that a communicable range of the communication component is wider than that if the reader/writer executes one of at least the operation of writing data into the first wireless tag attached to the print medium or the operation of reading data from the first wireless tag attached to the print medium.

11. The image forming system according to claim 6, wherein each image forming apparatus of the plurality of image forming apparatuses further comprises a preparation controller configured to control the forming component such that a preparation operation for the image formation by the forming component starts if the determination component determines that the user approaches the image forming apparatus.

12. An image forming system comprising a plurality of image forming apparatuses and a server, wherein the server comprises:

a storage component configured to correlate print data regarding an image to be formed by an image forming apparatus with a first identifier of a user and to store the correlated print data, and each image forming apparatus of the plurality of the image forming apparatuses comprises:

a forming component configured to execute image formation that comprises forming the image on a print medium, a communication component configured to wirelessly communicate with wireless tags, a reader/writer configured to execute, if the forming component executes the image formation on the print medium, using the communication component, one of at least an operation of writing data into a first wireless tag attached to the print medium on which the image formation is to be executed or an operation of reading data from the first wireless tag attached to the print medium on which the image formation is to be executed, a reader configured to read, if the image formation that is accompanied by one of at least the operation of writing data or the operation of reading data by the reader/writer is not executed, a second identifier of the user from a second wireless tag that stores the second identifier using the communication component if communication between the second wireless tag and the communication component is enabled, a determination component configured to determine that the user approaches the image forming apparatus if the second identifier read by the reader satisfies a predetermined condition, the reader/writer is configured to change an output intensity or a received threshold based on whether the image formation that is accompanied by one of at least the operation of writing data or the operation of reading data by the reader/writer is executed or is not executed, an acquisition component configured to acquire, if print data is correlated with the first identifier previously linked to the second identifier read by the reader unit and is stored in the storage component, the print data from the server, the acquisition component being provided in each image forming apparatus of the plurality of image forming apparatuses, and a print controller configured to control the forming component such that the image is formed based on the print data acquired by the acquisition component, the print controller being provided in each image forming apparatus of the plurality of image forming apparatuses.

13. The image forming system according to claim 12, wherein the server comprises a cloud server or a web server.

14. The image forming system according to claim 12, wherein the predetermined condition comprises a selection rule based upon a multi-function peripheral of which a distance from a position of a user terminal is less than or equal to a predetermined distance while a print request is selected as a stand-by machine.

15. The image forming system according to claim 12, wherein the reader/writer comprises a signal processor, a transmission component, an antenna duplexer, an antenna, a reception component, a controller, and an interface component.

16. The image forming system according to claim 12, wherein the forming component has a color printing function and a monochrome printing function.

17. The image forming system according to claim 12, wherein each image forming apparatus of the plurality of image forming apparatuses further comprises a communication controller configured to control, if the reader reads the second identifier of the user from the second wireless tag that stores the second identifier, the communication component such that a communicable range of the communication component is wider than that if the reader/writer executes one of at least the operation of writing data into the first wireless tag attached to the print medium or the operation of reading data from the first wireless tag attached to the print medium.

18. The image forming system according to claim 12, wherein each image forming apparatus of the plurality of image forming apparatuses further comprises a preparation controller configured to control the forming component such that a preparation operation for the image formation by the forming component starts if the determination component determines that the user approaches the image forming apparatus.

19. An information processing method, comprising:
forming an image on a print medium using a forming component;
wirelessly communicating with wireless tags with a communication component;
executing with a reader/writer, if the forming component executes the image formation on the print medium, using the communication component, one of at least an operation of writing data into a first wireless tag attached to the print medium on which the image formation is to be executed or an operation of reading data from the first wireless tag attached to the print medium on which the image formation is to be executed;
reading with a reader, if the image formation that is accompanied by one of at least the operation of writing data or the operation of reading data by the reader/writer is not executed, an identifier of a user from a second wireless tag that stores the identifier using the communication component if communication between the second wireless tag and the communication component is enabled; and
determining that the user approaches an image forming apparatus if the identifier read by the reader satisfies a predetermined condition,
the reader/writer is configured to change an output intensity or a received threshold based on whether the image formation that is accompanied by one of at least the operation of writing data or the operation of reading data by the reader/writer is executed or is not executed.

20. The information processing method according to claim 19, wherein the predetermined condition comprises a selection rule based upon a multi-function peripheral of which a distance from a position of a user terminal is less than or equal to a predetermined distance while a print request is selected as a stand-by machine.

* * * * *